(12) United States Patent
Wu et al.

(10) Patent No.: US 12,153,330 B2
(45) Date of Patent: *Nov. 26, 2024

(54) ANTI-SHAKE COMPENSATION STRUCTURE FOR AUTO-FOCUS

(71) Applicant: TDK TAIWAN CORP., Taoyuan (TW)

(72) Inventors: Fu-Yuan Wu, Taoyuan (TW); Chao-Chang Hu, Taoyuan (TW); Yi-Liang Chan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 444 days.

This patent is subject to a terminal disclaimer.

(21) Appl. No.: 17/105,146

(22) Filed: Nov. 25, 2020

(65) Prior Publication Data

US 2021/0080808 A1   Mar. 18, 2021

Related U.S. Application Data

(60) Continuation of application No. 15/684,101, filed on Aug. 23, 2017, now abandoned, which is a division of application No. 14/223,100, filed on Mar. 24, 2014, now Pat. No. 9,785,038, which is a division of application No. 12/910,519, filed on Oct. 22, 2010, now Pat. No. 8,982,464.

(51) Int. Cl.
| | |
|---|---|
| *G02B 27/64* | (2006.01) |
| *G02B 7/04* | (2021.01) |
| *G03B 17/00* | (2021.01) |
| *G02B 7/02* | (2021.01) |

(52) U.S. Cl.
CPC ............... *G03B 17/00* (2013.01); *G02B 7/04* (2013.01); *G02B 27/646* (2013.01)

(58) Field of Classification Search
CPC .... G02B 27/64; G02B 27/646; G02B 27/648; G02B 7/00; G02B 7/003; G02B 7/02; G02B 7/021; G02B 7/023; G02B 7/04
USPC .................. 359/813–824, 554–557
See application file for complete search history.

(56) References Cited

U.S. PATENT DOCUMENTS

| | | | |
|---|---|---|---|
| 5,637,861 A | 6/1997 | Okada et al. | |
| 6,086,209 A | 7/2000 | Miyahara et al. | |
| 6,388,789 B1 | 5/2002 | Bernstein | |
| 6,949,996 B2 | 9/2005 | Matsumoto et al. | |
| 7,400,463 B1 | 7/2008 | Wu | |
| 7,623,159 B2 | 11/2009 | Wada | |
| 7,881,598 B1 | 2/2011 | Wu et al. | |
| 8,253,813 B2 * | 8/2012 | Ke ........................... | G03B 5/00 |
| | | | 348/208.5 |

(Continued)

*Primary Examiner* — Thong Q Nguyen
(74) *Attorney, Agent, or Firm* — MUNCY, GEISSLER, OLDS & LOWE, P.C.

(57) ABSTRACT

An anti-shake compensation structure is provided. The anti-shake compensation structure includes an auto-focus module driving a lens to move along a light entering path of the lens. The auto-focus module includes a lens holder holding the lens, a coil adjacent to the lens holder, and a magnet corresponding to the coil. The anti-shake compensation structure further includes an outer frame supporting the lens holder, and a compensation driving unit driving the lens to sway relative to the outer frame along a direction not parallel to the light entering path. The compensation driving unit includes a compensation coil corresponding to the magnet.

17 Claims, 6 Drawing Sheets

(56) References Cited

U.S. PATENT DOCUMENTS

| | | |
|---|---|---|
| 8,611,735 B2 | 12/2013 | Sekimoto |
| 8,648,920 B2 | 2/2014 | Terajima |
| 8,947,545 B2 | 2/2015 | Han |
| 8,982,464 B2 | 3/2015 | Chan et al. |
| 9,785,038 B2 | 10/2017 | Wu |
| 2006/0227236 A1* | 10/2006 | Pak .................. H04N 23/55 257/E31.127 |
| 2008/0187301 A1 | 8/2008 | Takahashi |
| 2009/0052037 A1* | 2/2009 | Wernersson ......... G02B 27/646 359/554 |
| 2010/0080545 A1 | 4/2010 | Fan et al. |
| 2011/0075999 A1 | 3/2011 | Chiu |
| 2011/0110571 A1 | 5/2011 | Bar-Shalev |
| 2011/0217029 A1 | 9/2011 | Wu et al. |
| 2012/0154614 A1 | 6/2012 | Moriya |
| 2012/0229926 A1 | 9/2012 | Wade |
| 2013/0089311 A1 | 4/2013 | Jung |
| 2015/0168679 A1 | 6/2015 | Yeo |

* cited by examiner

ANTI-SHAKE COMPENSATION STRUCTURE FOR AUTO-FOCUS

CROSS REFERENCE TO RELATED APPLICATIONS

This application is a Continuation of U.S. application Ser. No. 15/684,101, filed on Aug. 23, 2017, for which is a Divisional of U.S. Pat. No. 9,785,038 B2, filed on Mar. 24, 2014, for which priority is claimed under 35 U.S.C. § 120, the entire contents of which are hereby incorporated by reference.

FIELD OF THE INVENTION

The present invention relates to an anti-shake compensation structure for auto-focus module, and more particularly to an anti-shake compensation structure that allows an auto-focus module to sway forward and rearward or leftward and rightward to thereby precisely compensate shake caused by hands.

BACKGROUND OF THE INVENTION

With the progress in scientific technologies and the modularization and miniaturization of camera lens, it is now possible to produce digital cameras having a very small volume, and most of currently available mobile phones are provided with the function of a digital camera. On the other hand, to highlight the differences between the advanced camera devices and the low-level camera devices, higher image quality and more functions, such as highly increased pixels, multi-point auto-focus (AF) function, anti-shake (AS) function, etc., have been further added to the advanced camera devices.

However, every new function added to the image capturing module of a camera device would necessitate the increase of a corresponding modular mechanism to thereby increase the volume of the image capturing module. Therefore, it has become a target of all image capturing module manufacturers to further reduce the volume of the capturing module that has more functions.

There are various types of auto-focus driving structures for the conventional miniature lens. Among others, the voice coil motor (VCM) is the currently most widely employed auto-focus driving structure. The VCM includes an assembly of coils, magnets and plate springs to hold a lens thereto, so that the lens is able to move forward and rearward in an optical axis direction to thereby achieve the object of auto focusing or zooming. The VCM has the advantages of small volume, low power consumption, accurately actuated displacement, and cost-effective, and is therefore very suitable for short-distance driving in miniature lens auto-focusing.

With respect to the anti-shake function, it is achieved mainly through several ways. For example, the imaging element can utilize a compensation movement of a mechanism supporting frame to offset the influence of shake during shooting picture on the forming of a blurred image. Or, the lens can be provided with a mechanical structure to eliminate the shake. Or, two gyro sensors can be used to detect any vibration of the imaging element in horizontal and vertical directions, and use push by magnetic force to compensate such vibration.

The same inventor of the present invention filed U.S. patent application Ser. No. 12/630,688 entitled "Anti-shake Auto-focus Modular Structure" on Dec. 3, 2009, and FIG. 1 is an exploded perspective view of the anti-shake auto-focus modular structure disclosed therein. According to the above-mentioned invention, a movement signal generated by a shake sensor is used to drive the whole auto-focus module to instantaneously move horizontally in x-axis or y-axis direction, so as to compensate any shake caused by hands.

Now, based on the structural design of the above-mentioned invention, the inventor further designs a new anti-shake structure for auto-focus module. Unlike the above-mentioned invention that teaches the horizontal movement of the whole auto-focus module in x-axis direction or y-axis direction to compensate any shake, the new anti-shake structure in the present invention uses a center of the auto-focus module as a fulcrum to sway the auto-focus module leftward, rightward, forward or rearward for compensating any shake caused by hands, the anti-shake structure is therefore simpler and the effect of shake compensation can be produced more quickly to satisfy the requirement for an advanced camera lens module.

SUMMARY OF THE INVENTION

A primary object of the present invention is to provide an anti-shake driving mechanism for auto-focus module, which allows the auto-focus module to use a center thereof as a fulcrum to sway forward, rearward, leftward or rightward, in order to compensate shake caused by hands, making the anti-shake structure simpler and more efficient.

To achieve the above and other objects, an anti-shake driving mechanism, including a movable portion, a fixed portion, and a compensation driving assembly. The movable portion, carrying a bottom plate, wherein the bottom plate carries an optical sensing element that corresponds to a light entering path, wherein the bottom plate has a plate-like shape and is perpendicular to the light entering path. The fixed portion includes a base adjacent to the bottom plate, wherein the base has a plate-like shape and is perpendicular to the light entering path, wherein the movable portion is movable relative to the fixed portion. The compensation driving assembly, driving the movable portion to move relative to the fixed portion along a direction that is not parallel to the light entering path. The base bottom does not have a through hole that is corresponding to the light entering path.

In one embodiment, a gap is provided between the bottom plate and the base, so that the bottom plate is movable relative to the base.

In one embodiment, the bottom plate is located between the optical sensing element and the base when viewed along a direction that is perpendicular to the light entering path.

In one embodiment, the anti-shake driving mechanism further includes a suspension element, wherein the movable portion is movably connected to the fixed portion via the suspension element, and the bottom plate is located between a portion of the suspension element that is in direct contact with the fixed portion and the base when viewed along a direction that is perpendicular to the light entering path.

In one embodiment, the anti-shake driving mechanism further includes a suspension element, wherein the movable portion is movably connected to the fixed portion via the suspension element, and the bottom plate is located between a portion of the suspension element that is in direct contact with the movable portion and the base when viewed along a direction that is perpendicular to the light entering path.

In one embodiment, the anti-shake driving mechanism further includes a suspension element, wherein the movable portion is movably connected to the fixed portion via the suspension element, and the bottom plate is located between the suspension element and the base when viewed along a direction that is perpendicular to the light entering path.

In one embodiment, the anti-shake driving mechanism further includes a position sensing element, sensing the movement of the movable portion relative to the fixed portion, wherein the position sensing element does not overlap the optical sensing element when viewed along the light entering path.

In one embodiment, the position sensing element at least partially overlaps the compensation driving assembly when viewed along the light entering path.

In one embodiment, the position sensing element at least partially overlaps a compensation magnetic element of the compensation driving assembly when viewed along the light entering path.

In one embodiment, the position sensing element does not overlap a compensation coil of the compensation driving assembly when viewed along the light entering path.

In one embodiment, the movable portion carries a lens that is corresponding to the optical sensing element, wherein the lens is movable relative to the optical sensing element and the fixed portion.

In one embodiment, the anti-shake driving mechanism further includes a focus driving assembly, driving the lens to move relative to the optical sensing element along the light entering path, wherein the focus driving assembly at least partially overlaps the bottom plate when viewed along the light entering path.

In one embodiment, a focus coil of the focus driving assembly does not overlap the position sensing element when viewed along the light entering path.

In one embodiment, the focus driving assembly at least partially overlaps the position sensing element when viewed along the light entering path.

In one embodiment, a focus magnetic element of the focus driving assembly at least partially overlaps the position sensing element when viewed along the light entering path.

In one embodiment, the anti-shake driving assembly is at least partially located between the optical sensing element and the base when viewed along a direction that is perpendicular to the light entering path.

In one embodiment, the optical sensing element is at least partially located between the anti-shake driving assembly and the position sensing element when viewed along a direction that is perpendicular to the light entering path.

In one embodiment, the position sensing element is at least partially located between the optical sensing element and the base when viewed along a direction that is perpendicular to the light entering path.

In one embodiment, the focus driving assembly includes a focus coil and a focus magnetic element, the anti-shake driving assembly includes an anti-shake coil and an anti-shake magnetic element. The focus magnetic element and the anti-shake magnetic element are formed as an integrated structure, and the position sensing element is corresponding to the anti-shake magnetic element to sense the movement of the movable portion relative to the fixed portion.

In one embodiment, the movable portion carries a lens that is corresponding to the optical sensing element, the movable portion brings the lens and the optical sensing element to move relative to the fixed portion when the movable portion moves relative to the fixed portion.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
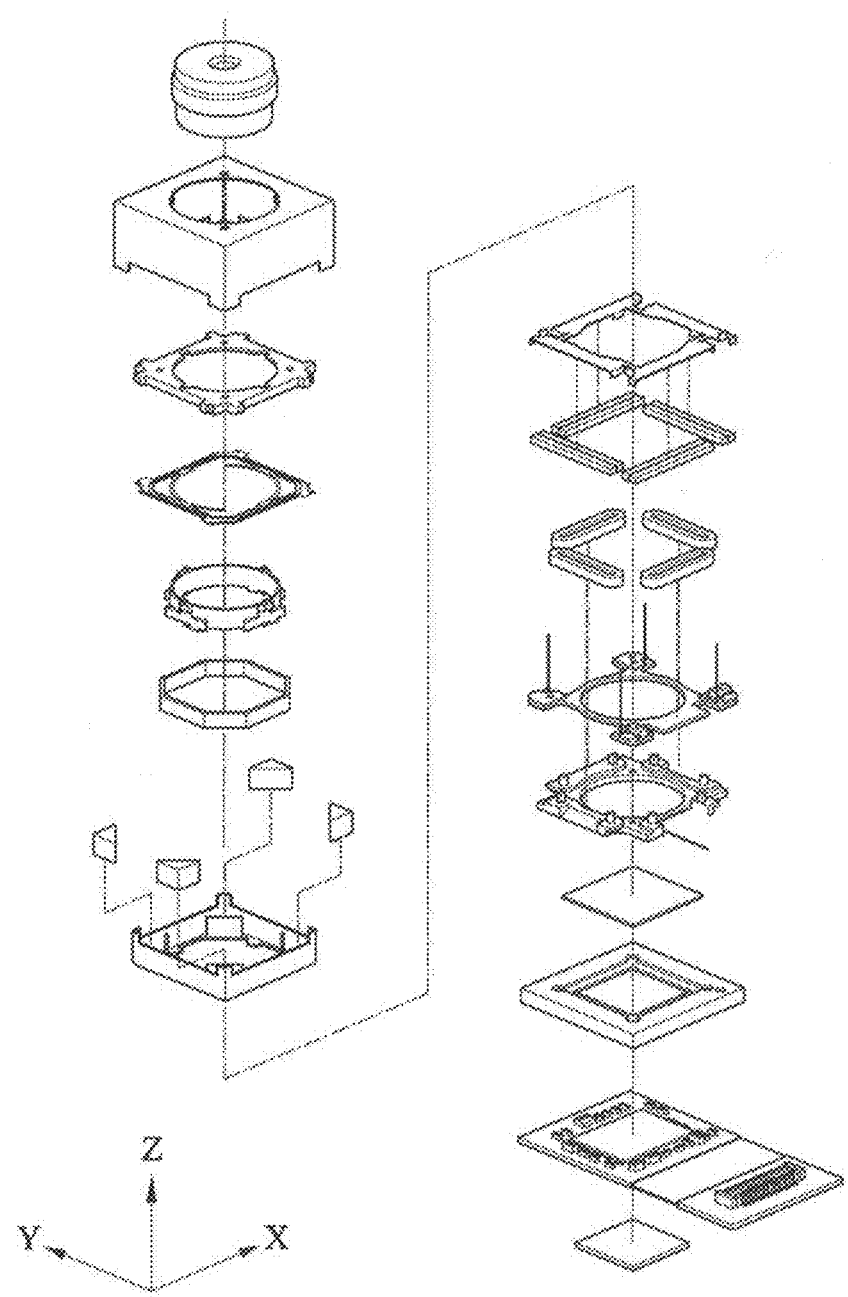
FIG. 1 is an exploded perspective view of an anti-shake auto-focus modular structure disclosed in U.S. patent application Ser. No. 12/630,688.

The present invention will now be described with some preferred embodiments thereof and with reference to the accompanying drawings. It is understood the accompanying drawings are illustrated only for assisting in describing the present invention and not intended to limit the present invention. For the purpose of easy to understand, elements that are the same in the preferred embodiments are denoted by the same reference numerals.

Figure 2:
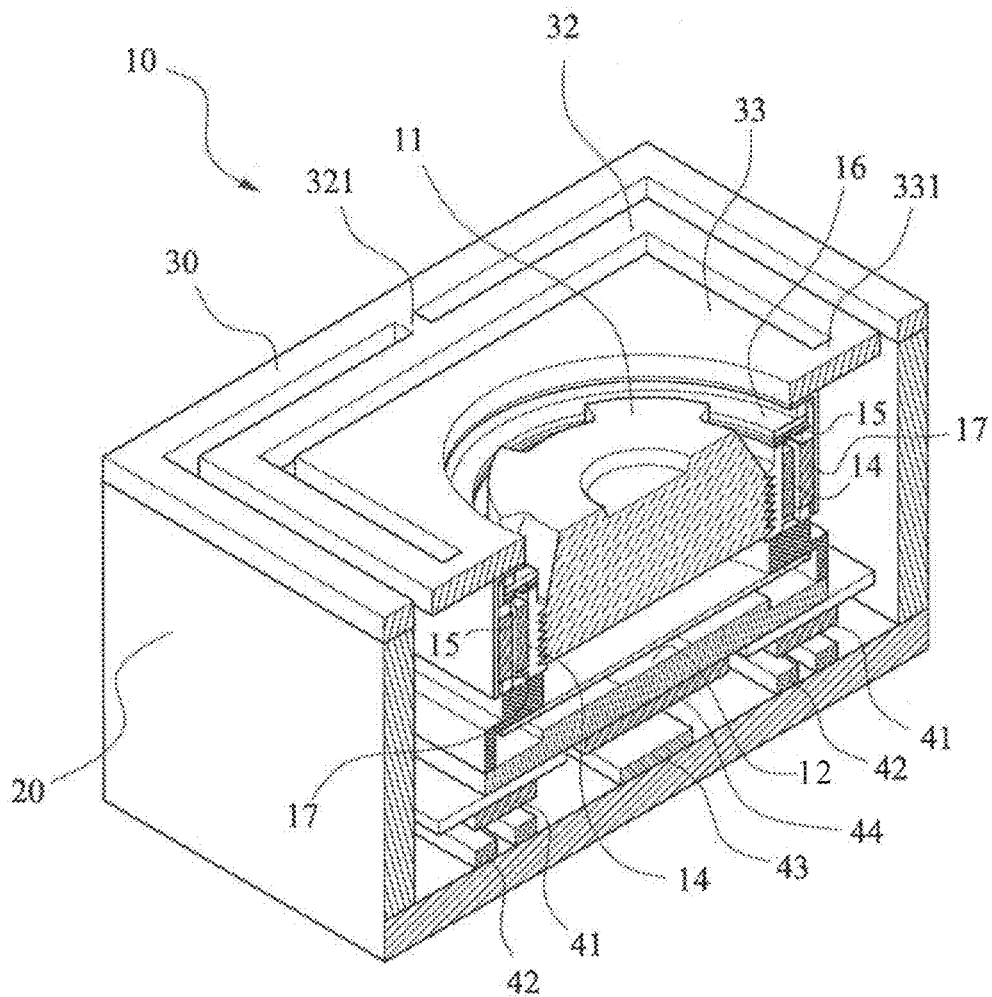
FIG. 2 is a sectional perspective view of an anti-shake compensation structure for auto-focus module according to a first embodiment of the present invention.
Figure 3:
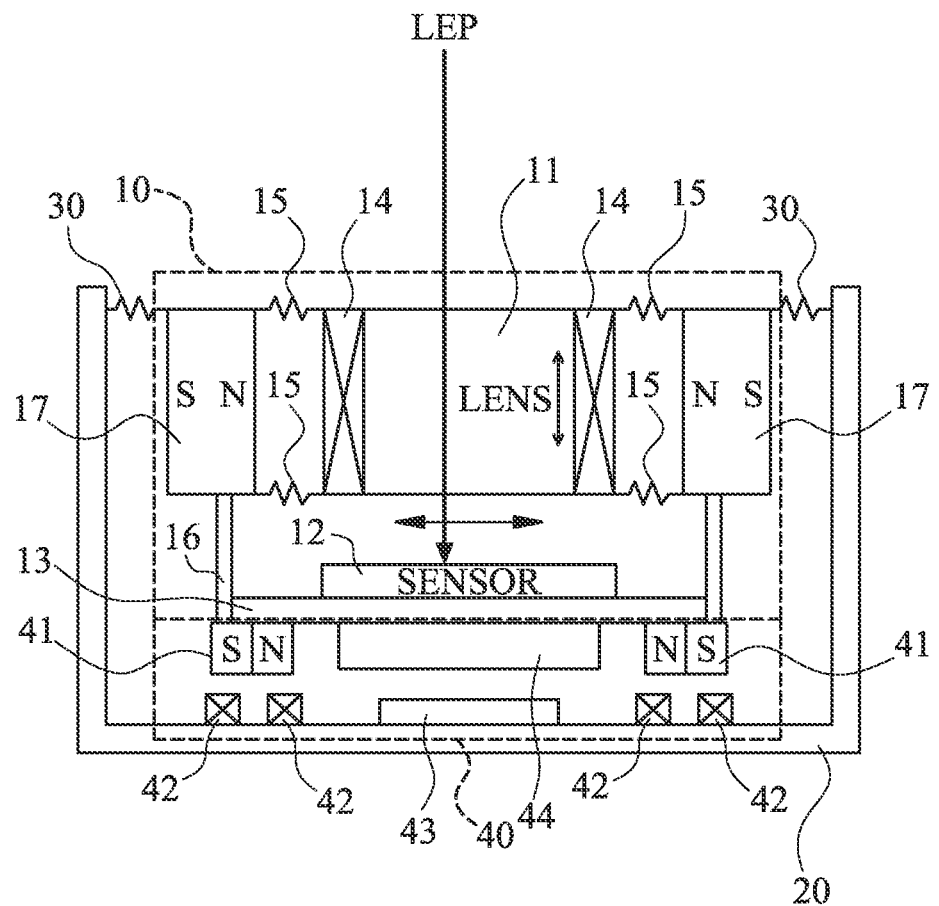
FIG. 3 is a schematic plan view of FIG. 2.

Please refer to FIG. 2 that is a partial sectional perspective view of an anti-shake compensation structure for auto-focus module according to a first embodiment of the present invention; and to FIG. 3 that is a schematic plan view of FIG. 2. The present invention uses a center of an auto-focus module as a fulcrum to sway the auto-focus module leftward and rightward on x-axis or forward and rearward on y-axis for compensating any shake caused by hands, so as to improve the anti-shake auto-focus modular structure disclosed in U.S. patent application Ser. No. 12/630,688 that horizontally moves an auto-focus module in x-axis or y-axis direction for compensating any shake caused by hands while shooting a picture.

The anti-shake compensation structure for auto-focus module according to the first embodiment of the present invention includes an auto-focus module 10, an outer frame 20 (may be considered as the fixed portion), an elastic supporting member 30, a compensation driving unit 40 (may be considered as the first driving assembly), and a shake sensor (not shown). A lens 11 is held to the auto-focus module 10 for capturing light and image. The lens 11 and an image sensor 12 (may be considered as the optical sensing element) are aligned with each other on z-axis, that is, on a line along which light enters into the lens 11. Moreover, the image sensor 12 is supported by a bottom plate 13. The auto-focus module 10 drives the lens 11 to move forward and rearward in the light entering path LEP (i.e. z-axis direction), so that the lens 11 can focus the captured image on the image sensor 12.

The auto-focus module 10 is preferably a driving structure formed of a voice coil motor (VCM); and includes a lens holder for holding and locking the lens 11 thereto. A coil 14 (may be considered as the coil of the second driving assembly) is arranged around the lens holder, and the lens holder is connected to a movable portion of at least one plate spring 15, while the at least one plate spring 15 is connected at a fixed portion thereof to a base 16. Four magnets 17 (may be considered as the magnetic element of the second driving assembly) are arranged in the base 16 corresponding to the coil 14.

The outer frame 20 encloses the auto-focus module 10. The elastic supporting member 30 is arranged on an inner upper end of the outer frame 20 and connected to an upper end of the auto-focus module 10, so as to suspend the auto-focus module 10 in the outer frame 20. With the elastic supporting member 30 arranged in the above-described manner, the auto-focus module 10 is allowed to sway forward and rearward or leftward and rightward with a center of the elastic supporting member 30 acting as a fulcrum.

Figure 4:
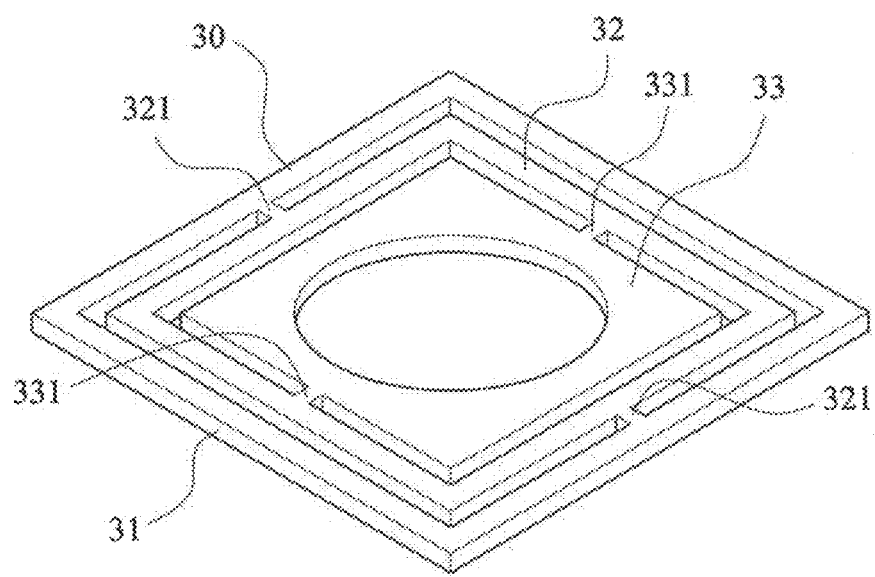
FIG. 4 is a perspective view showing an embodiment of an elastic supporting member used in the present invention.

Please refer to FIG. 4 that is a perspective view showing an embodiment of an elastic supporting member used in the present invention. As shown, the elastic supporting member 30 includes an outer fixed portion 31, a first inner movable portion 32, and a second inner movable portion 33. The outer fixed portion 31 is fixedly connected to the inner upper end of the outer frame 20; the first inner movable portion 32 is located at an inner side of the outer fixed portion 31, and is connected at two opposite and symmetrical first pivot portions 321 to the outer fixed portion 31; and the second inner movable portion 33 is located at an inner side of the first inner movable portion 32, and is connected at two opposite and symmetrical second pivot portions 331 to the first inner movable portion 32. It is noted the two second pivot portions 331 are respectively located at an angular position of 90 degrees relative to the first pivot portions 321, and the second inner movable portion 33 is connected to the upper end of the auto-focus module 10.

The first inner movable portion 32 allows the auto-focus module 10 to sway leftward and rightward on x-axis; and the second inner movable portion 33 allows the auto-focus module 10 to sway forward and rearward on y-axis. Alternatively, the present invention can be differently designed for the first inner movable portion 32 to allow the auto-focus module 10 to sway forward and rearward on y-axis; and for the second inner movable portion 33 to allow the auto-focus module 10 to sway leftward and rightward on x-axis.

Please refer to FIGS. 2 and 3 at the same time again. The compensation driving unit 40 is located behind the auto-focus module 10 for driving the auto-focus module 10 to sway leftward and rightward on x-axis or forward and rearward on y-axis within the outer frame 20, so as to compensate any image deviation due to shake caused by hands.

The compensation driving unit 40 includes a compensation magnet assembly 41, a compensation coil assembly 42, and a displacement sensor assembly. The compensation magnet assembly 41 is arranged beneath an outer bottom face of the auto-focus module 10, and includes at least one x-axis compensation magnet and at least one y-axis compensation magnet.

The compensation coil assembly 42 is arranged on an inner bottom face of the outer frame 20, and includes at least one x-axis compensation coil and at least one y-axis compensation coil corresponding to the x-axis compensation magnet and the y-axis compensation magnet, respectively, for separately generating an electromagnetic field to drive the auto-focus module 10 to tilt on x-axis or y-axis.

The displacement sensor assembly is arranged on a central area of the inner bottom face of the outer frame 20, and includes a displacement sensor 43 (may be considered as the position sensing element) and a sensing magnet 44. Preferably, the displacement sensor 43 is a two-axis sensing IC. The displacement sensor 43 corresponds to the sensing magnet 44 for detecting a volume of displacement in x-axis direction or y-axis direction, so that the auto-focus module 10 can be driven to reach at a precise compensation position.

Preferably, the displacement sensor 43 can be a Hall sensor, a magneto-resistive (MR) sensor, a fluxgate sensor, an optical position sensor, or an optical encoder.

An advanced hand-held device is generally provided with a shake sensor, such as a Gyro sensor, an accelerometer, etc., for generating a shake signal in response to any shake of the hand-held device and sending the shake signal to the compensation driving unit for use as a basis to determine an angle by which the auto-focus module should be driven to tilt on x-axis or y-axis. The present invention may utilize the shake sensor provided in the advanced hand-held device in the case the present invention is provided on the hand-held device. Alternatively, the anti-shake compensation structure of the present invention can be directly provided with a shake sensor.

Figure 5:
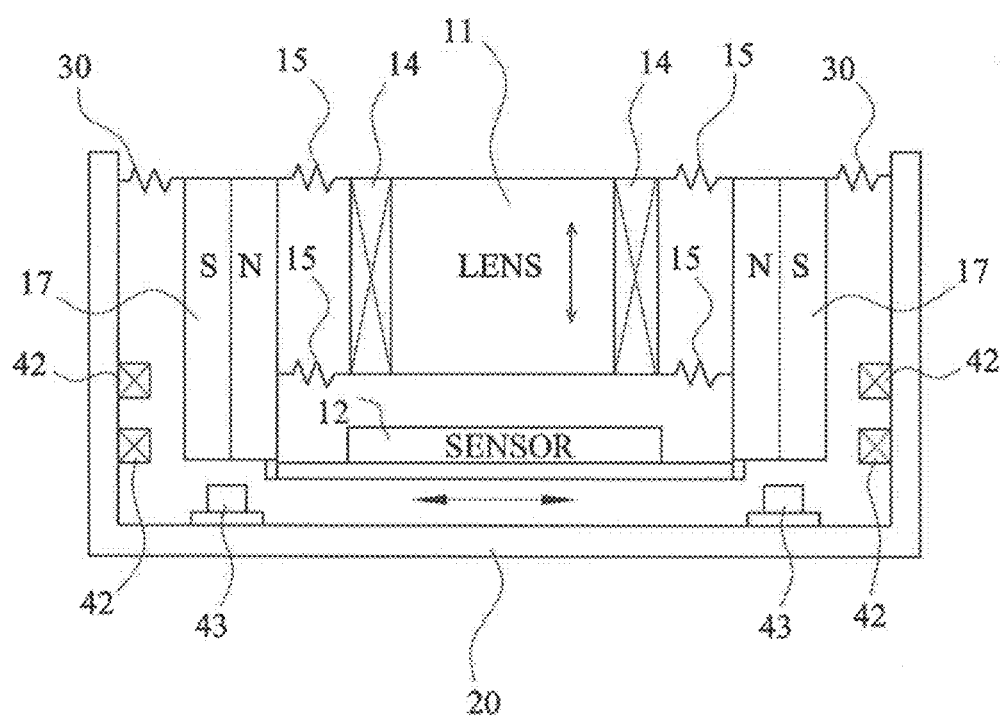
FIG. 5 is a schematic plan view of an anti-shake compensation structure for auto-focus module according to a second embodiment of the present invention.

FIG. 5 is a schematic plan view of an anti-shake compensation structure for auto-focus module according to a second embodiment of the present invention, in the second embodiment, the compensation driving unit 40 includes a compensation coil assembly 42, and a displacement sensor 43. And, the magnets 17 in the auto-focus module 10 are also used as the compensation magnet assembly. That is, the compensation driving unit 40 and the auto-focus module 10 use the same set of magnets.

The compensation coil assembly 42 is arranged on an inner wall surface of the outer frame 20, and includes at least one x-axis compensation coil and at least one y-axis compensation coil separately corresponding to one of the magnets 17 in the auto-focus module 10 for respectively generating an electromagnetic field to drive the auto-focus module 10 to tilt on x-axis or y-axis.

The displacement sensor 43 is arranged on the inner bottom face of the outer frame 20, and includes an x-axis sensor and a y-axis sensor separately corresponding to one of the magnets 17 in the auto-focus module 10 for detecting a volume of displacement in x-axis direction or y-axis direction, so that the auto-focus module 10 can be driven to reach at a precise compensation position.

Figure 6:
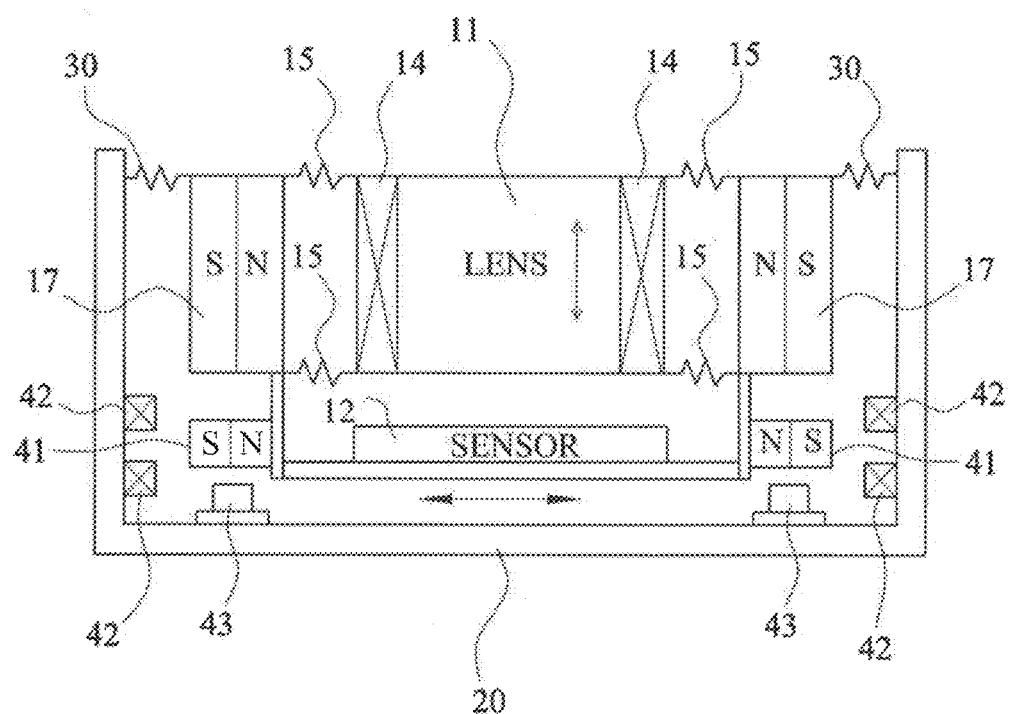
FIG. 6 is a schematic plan view of an anti-shake compensation structure for auto-focus module according to a third embodiment of the present invention.

FIG. 6 is a schematic plan view of an anti-shake compensation structure for auto-focus module according to a third embodiment of the present invention. In the third embodiment, the compensation driving unit 40 includes a compensation magnet assembly 41, a compensation coil assembly 42, and a displacement sensor 43. The compensation magnet assembly 41 is arranged on an outer lower end of the auto-focus module 10, and includes at least one x-axis compensation magnet and at least one y-axis compensation magnet.

The compensation coil assembly 42 is arranged on an inner lower end of the outer frame 20, and includes at least one x-axis compensation coil and at least one y-axis compensation coil corresponding to the x-axis compensation magnet and the y-axis compensation magnet, respectively, for separately generating an electromagnetic field to drive the auto-focus module to tilt on x-axis or y-axis.

The displacement sensor 43 is arranged on the inner bottom face of the outer frame 20, and includes an x-axis sensor and a y-axis sensor corresponding to the x-axis compensation magnet and the y-axis compensation magnet, respectively, for detecting a volume of displacement in x-axis direction or y-axis direction, so that the auto-focus module 10 can be driven to reach at a precise compensation position.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An anti-shake driving mechanism, comprising:
   a movable portion, for carrying a bottom plate, wherein the bottom plate carries an optical sensing element that corresponds to a light entering path, wherein the bottom plate has a plate-like shape and is perpendicular to the light entering path;
   a fixed portion, comprising:
   an outer frame, adjacent to the bottom plate, wherein the outer frame has a plate-like shape and does not have a through hole that is corresponding to the light entering path, wherein the movable portion is movable relative to the fixed portion;
   a first driving assembly, comprising a magnet and a coil, driving the movable portion to move relative to the fixed portion along a direction that is perpendicular to the light entering path; and
   a position sensing element, sensing a movement of the movable portion relative to the fixed portion,
   wherein the bottom plate is movable relative to the outer frame,
   wherein the position sensing element does not overlap the optical sensing element when viewed along the light entering path,
   wherein the movable portion carries a lens that is corresponding to the optical sensing element, wherein the lens is movable relative to the optical sensing element and the fixed portion.

2. The anti-shake driving mechanism as claimed in claim 1, wherein a gap is provided between the bottom plate and the outer frame.

3. The anti-shake driving mechanism as claimed in claim 2, wherein
   the bottom plate is located between the optical sensing element and the outer frame when viewed along a direction that is perpendicular to the light entering path.

4. The anti-shake driving mechanism as claimed in claim 1, further comprising a suspension element, wherein the movable portion is movably connected to the fixed portion via the suspension element, and the bottom plate is located between a portion of the suspension element that is in direct contact with the fixed portion and the outer frame when viewed along a direction that is perpendicular to the light entering path.

5. The anti-shake driving mechanism as claimed in claim 1, further comprising a suspension element, wherein the movable portion is movably connected to the fixed portion via the suspension element, and the bottom plate is located between a portion of the suspension element that is in direct contact with the movable portion and the outer frame when viewed along a direction that is perpendicular to the light entering path.

6. The anti-shake driving mechanism as claimed in claim 1, further comprising a suspension element, wherein the movable portion is movably connected to the fixed portion via the suspension element, and the bottom plate is located between the suspension element and the outer frame when viewed along a direction that is perpendicular to the light entering path.

7. The anti-shake driving mechanism as claimed in claim 1, wherein the position sensing element at least partially overlaps the first driving assembly when viewed along the light entering path.

8. The anti-shake driving mechanism as claimed in claim 1, wherein the position sensing element at least partially overlaps a magnetic element of the first driving assembly when viewed along the light entering path.

9. The anti-shake driving mechanism as claimed in claim 1, wherein the position sensing element does not overlap a coil of the first driving assembly when viewed along the light entering path.

10. The anti-shake driving mechanism as claimed in claim 1, further comprising a second driving assembly, driving the lens to move relative to the optical sensing element along the light entering path, wherein the second driving assembly at least partially overlaps the bottom plate when viewed along the light entering path.

11. The anti-shake driving mechanism as claimed in claim 10, wherein a coil of the second driving assembly does not overlap the position sensing element when viewed along the light entering path.

12. The anti-shake driving mechanism as claimed in claim 10, wherein the second driving assembly at least partially overlaps the position sensing element when viewed along the light entering path.

13. The anti-shake driving mechanism as claimed in claim 10, wherein a magnetic element of the second driving assembly at least partially overlaps the position sensing element when viewed along the light entering path.

14. The anti-shake driving mechanism as claimed in claim 10, wherein the first driving assembly is at least partially located between the optical sensing element and the outer frame when viewed along a direction that is perpendicular to the light entering path.

15. The anti-shake driving mechanism as claimed in claim 10, wherein the position sensing element is at least partially located between the optical sensing element and the outer frame when viewed along a direction that is perpendicular to the light entering path.

16. The anti-shake driving mechanism as claimed in claim 15, wherein the second driving assembly comprises a coil and a magnetic element, the first driving assembly comprises a coil and a magnetic element,
   wherein the magnetic element of the second driving assembly and the magnetic element of the first driving assembly are formed as an integrated structure, and the position sensing element is corresponding to the magnetic element of the first driving assembly to sense the movement of the movable portion relative to the fixed portion.

17. The anti-shake driving mechanism as claimed in claim 1, wherein the movable portion carries a lens that is corresponding to the optical sensing element, the movable portion brings the lens and the optical sensing element to move relative to the fixed portion when the movable portion moves relative to the fixed portion.

* * * * *